United States Patent [19]

Butler

[11] 4,440,273

[45] Apr. 3, 1984

[54] AERATION PREVENTING SHOCK ABSORBER

[75] Inventor: William S. Butler, Burleson, Tex.

[73] Assignee: Halliburton Company, Duncan, Okla.

[21] Appl. No.: 335,120

[22] Filed: Dec. 28, 1981

[51] Int. Cl.³ .............................................. F16F 9/34
[52] U.S. Cl. .................................... 188/315; 188/318; 267/64.23; 137/513.7; 137/539.5
[58] Field of Search ............... 188/280, 315, 318, 320, 188/322.19, 322.21; 267/64.17, 64.19, 64.21, 64.23, 64.24; 137/513.7, 539.5

[56] References Cited

U.S. PATENT DOCUMENTS

| 2,470,372 | 5/1949 | Roth ................................... | 137/539.5 |
| 3,556,264 | 1/1971 | De Konig et al. .................. | 188/281 |
| 3,682,103 | 8/1972 | Schwam ............................. | 188/316 |
| 4,106,412 | 8/1978 | Farris et al. ......................... | 188/286 |
| 4,240,531 | 12/1980 | Postema ............................. | 188/315 |

FOREIGN PATENT DOCUMENTS

| 1913777 | 11/1969 | Fed. Rep. of Germany ... | 267/64.23 |
| 2012297 | 10/1971 | Fed. Rep. of Germany ... | 137/539.5 |
| 378697 | 7/1964 | Switzerland ..................... | 267/64.17 |
| 687025 | 2/1953 | United Kingdom ............. | 137/539.5 |

Primary Examiner—Douglas C. Butler
Assistant Examiner—R. R. Diefendorf
Attorney, Agent, or Firm—James R. Duzan; Thomas R. Weaver

[57] ABSTRACT

A shock absorber comprising a cylinder, cylinder head having a relief check valve therein including an annular valve spool, relief valve ball, spring support, valve spring and valve cap, piston, piston head, outer case, foot valve body, dust cover, piston bellows and pivot bushing assemblies.

8 Claims, 3 Drawing Figures

AERATION PREVENTING SHOCK ABSORBER

BACKGROUND OF THE INVENTION

This invention relates to a shock absorber for railcars. More specifically, the invention relates to a shock absorber for use on a trailer on flat car (TOFC) service railcar utilizing a single axle truck.

In the development of more fuel efficient railcars for trailer on flat car (TOFC) service some types of fuel efficient TOFC railcars which are comprised of articulated units having non-cushioned trailer hitches installed thereon control the forces transmitted to the trailer load through the use of end-of-car cushioning devices on the TOFC railcar and the use of shock absorbers between the trucks and frame of the TOFC railcar. These types of articulated TOFC railcars offer significant advantages over the conventional eighty-nine foot (89') flat railcar in loading of the trailers on the TOFC railcar and fuel savings during operation of the train.

While some prior art shock absorbers may be utilized for such new articulated TOFC railcars, it is desirable to have a shock absorber designed specifically for use in such railcars. Typical prior art shock absorbers are described or referred to in U.S. Pat. Nos. 3,556,264, 3,682,103, and 4,106,412.

SUMMARY OF THE INVENTION

The shock absorber of the present invention is designed for use in the fuel efficient, articulated TOFC railcars and is a reliable, easy to manufacture unit having an improved means for oil control to prevent aeration of the oil or air entrainment in the oil during use thereby yielding improved performance. The shock absorber of the present invention comprises a cylinder, cylinder head, piston, piston head, outer case, foot valve body, dust cover, piston bellows, and pivot bushing assemblies.

DESCRIPTION OF THE INVENTION

Figure 1:
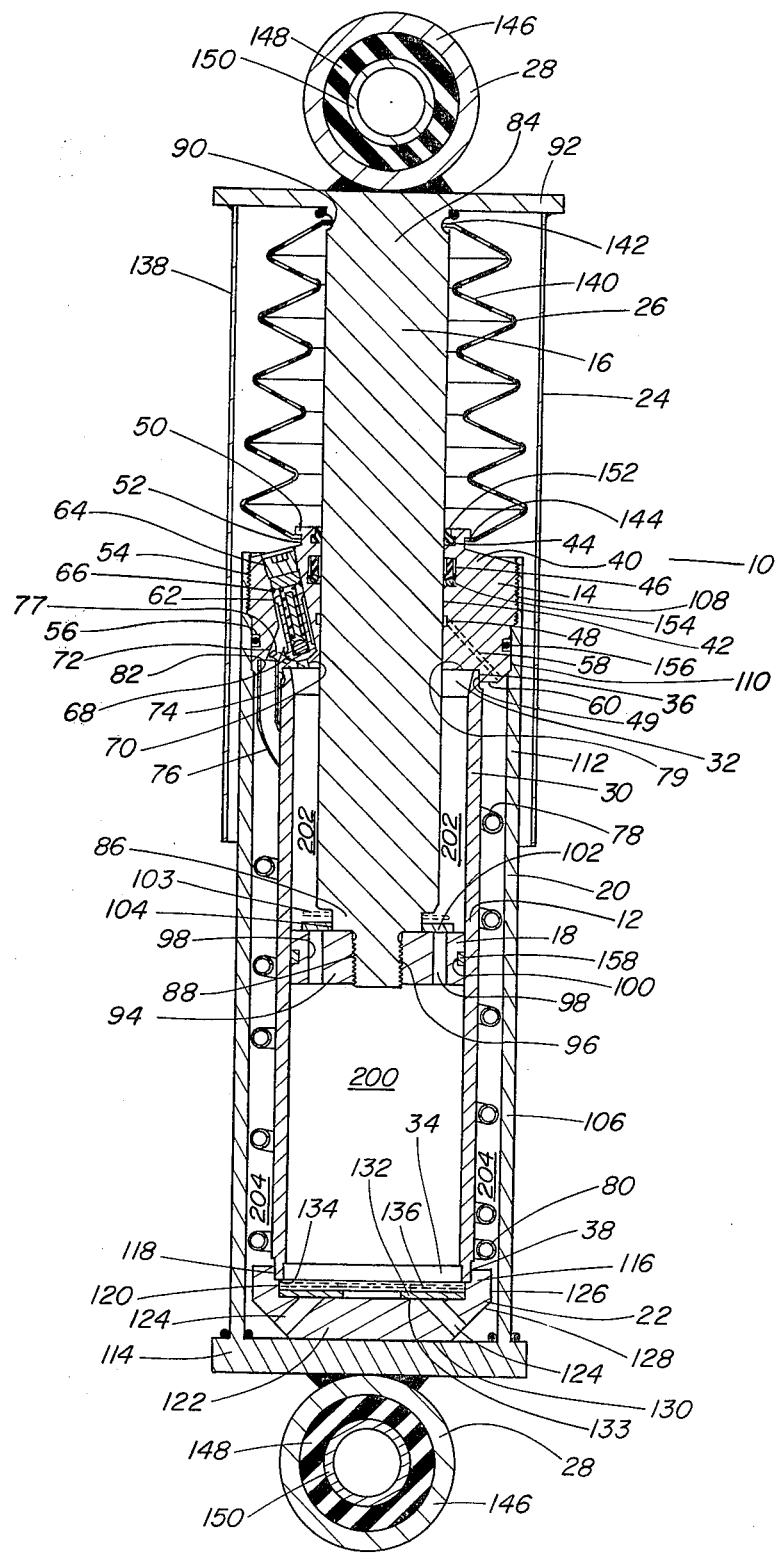
FIG. 1 is a cross-sectional view of the present invention.

Referring to FIG. 1, the shock absorber 10 of the present invention comprises cylinder 12, cylinder head 14, piston 16, piston head 18, outer case 20, foot valve body 22, dust cover 24, piston bellows 26 and pivot bushing assemblies 28.

The cylinder 12 comprises a cylindrical annular member 30 having a chamfered annular surface 32 on the interior of one end thereof, annular recess 34 on the interior of the other end thereof, upper annular recess 36 on the exterior of one end thereof and lower annular recess 38 on the exterior of the other end thereof.

The cylinder head 14 comprises a cylindrical annular member 40 having a bore 42 therethrough having, in turn, first annular seal recess 44, second annular seal recess 46, and annular oil recess 48 therein, counter bore 49 which sealingly engages upper annular recess 36 of the cylinder 12, annular bellows lip 50 on the exterior of one end thereof, annular bellows recess 52 on the exterior thereof, threaded exterior portion 54 which engages a portion of the outer case 20, annular seal recess 56 on the exterior thereof, oil transfer bore 58 connecting annular oil recess 48 with the exterior end surface 60, relief valve bore 62 having, in turn, threaded portion 64, intermediate portion 66, conical surface 68 and reduced diameter portion 70, oil transfer bore 72 connecting relief valve bore 62 to oil return tube bore 74, oil return tube 76 and fixed orifice bore 77 which extends from annular end surface 79 of the cylinder head 14 to oil return tube bore 74. The oil return tube 76 comprises a spiral wound tubular member 78 which has an overall inner diameter slightly larger than the exterior diameter of cylinder 12, an overall outer diameter slightly smaller than the interior diameter of the outer case 20 and an overall length sufficient for the outlet 80 of the tubular member 78 to be located near the top of the foot valve body 22 and extend substantially below the free surface of the oil in the shock absorber 10 contained between the cylinder 12 and outer case 20 when the shock absorber 10 is in operation. The inlet 82 of the tubular member 78 is secured to oil return tube bore 74 of the cylinder head 14.

The piston 16 comprises an elongated cylindrical member 84 having a reduced diameter portion 86 on one end thereof, threaded portion 88 on one end thereof, bellows recess 90 in the exterior surface on the other end thereof and dust cover end 92 secured to the other end thereof.

The piston head 18 comprises a cylindrical annular member 94 having threaded bore 96 therethrough, a plurality of holes 98 surrounding threaded bore 96 and extending through piston head 18, annular seal recess 100 in the exterior thereof and ring valve plate 102 which covers the plurality of holes 98 in piston head 18 and has a bore 104 therethrough having, in turn, a diameter sufficient to allow the ring valve plate 102 to move freely upon the reduced diameter portion 86 of the piston 16 when the plate 102 is installed thereon. The ring valve plate 102 moving on the piston 16 in response to oil contained within cylinder 12 flowing through the plurality of holes 98 in piston head 18 into the cavity 202 formed between cylinder 12 and piston 16. If desired, a spring 103 (shown in dotted lines) may be included on the reduced diameter portion 86 of the piston 16 to bias the ring valve plate 102 into engagement with the piston head 18.

The outer case 20 comprises a cylindrical elongated annular member 106 having a threaded bore 108 on one end thereof, first bore 110, second bore 112, and outer case cover 114 secured to the other end thereof.

The foot valve body 22 comprises a cylindrical member 116 having first bore 118 receiving annular recess 38 of cylinder 12 therein, second bore 120 of smaller diameter than bore 118, end 122 having, in turn, a plurality of holes 124 therein, cylindrical exterior surface 126, annular chamfered surface 128, end surface 130 which abuts the interior of outer case cover 114 and foot valve plate 132 which overlies the plurality of holes 124 and is slidably retained in second bore 120 by abutting the end surface 134 of cylinder 12. If desired, a spring 136 (shown in dotted lines) may be installed between end surface 134 of cylinder 12 and foot valve plate 132 to bias the plate 132 against end surface 133 of foot valve body 22.

The dust cover 24 comprises a cylindrical elongated annular member 138 having one end secured to dust cover end 92 while the other end surrounds the upper portion of the outer case 20.

The piston bellows 26 comprises an elastomeric, resilient bellows 140 having one end 142 retained within annular bellows recess 90 in the exterior surface of piston 16 while the other end 144 is retained within annular bellows recess 52 in the exterior of cylinder head 14.

The pivot bushing assemblies 28 each comprise cylindrical pivot housing 146 which is secured either to dust cover end 92 or outer case cover 114, elastomeric bushing 148 and pivot bushing 150 contained within elastomeric bushing 148.

The first annular seal recess 44 in the cylinder head 14 contains suitable elastomeric piston wiper seal 152 therein while second annular seal recess 46 in cylinder head 14 contains suitable elastomeric piston seal 154 therein, annular seal recess 56 contains suitable elastomeric seal 156 therein and annular seal recess 100 in piston head 18 contains suitable metallic piston seal ring 158 therein.

Figure 2:
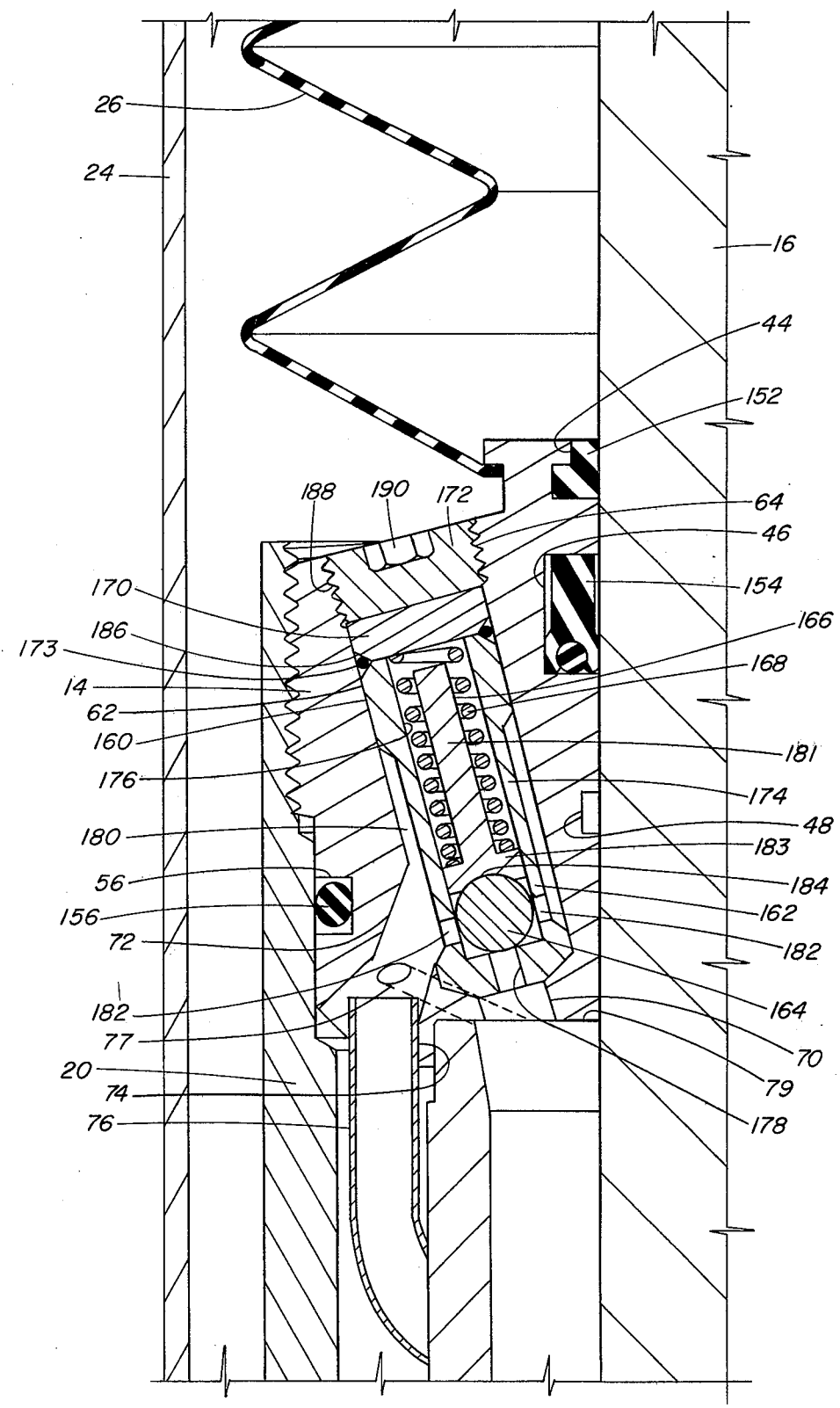
FIG. 2 is a cross-sectional enlarged view of the relief check valve assembly of the present invention.

Referring to FIG. 2, the relief check valve assembly 160 located within the cylinder head 14 is shown. The relief check valve assembly 160 comprises valve spool 162, relief valve ball 164, spring support 166, valve spring 168, valve cap 170, set screw 172, and elastomeric seal 173.

The valve spool 162 comprises an elongated, cylindrical, annular member 174 having a first bore 176 therein, second bore 178, annular recess 180 in the exterior thereof and plurality of holes 182 therethrough which allow communication between first bore 176 and annular recess 180.

The relief valve ball 164 comprises a spherical ball which is received within valve spool 162 in first bore 176 and covers second bore 178.

The spring support 166 comprises a cylindrical shaft 181 having a cylindrical head 183 on one end thereof which has, in turn, recess 184 therein to receive relief valve ball 164 therein.

The valve spring 168 comprises a spirally wound valve spring slidably retained within first bore 176 of valve spool 162 having an overall inner diameter sufficiently large to slidably receive cylindrical shaft 181 of spring support 166 therein such that one end of the valve spring abuts the cylindrical head 183 of spring support 166.

The valve cap 170 comprises a cylindrical member which is slidably received within bore 62 of cylinder head 14 and has chamfered surface 186 on one end thereof.

The set screw 172 comprises a cylindrical member having a threaded exterior surface 188 thereon which engages threaded portion 64 of relief valve bore 62 of cylinder head 14 and recess 190 in one end thereof to engage a suitable tool to allow the installation of the set screw 172 in the cylinder head 14.

Figure 3:
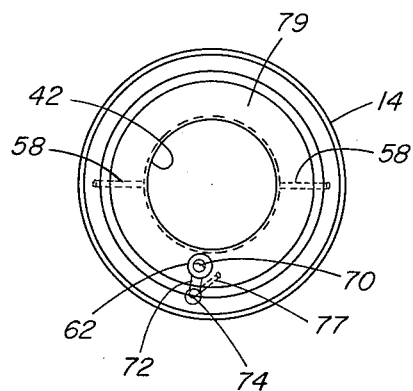
FIG. 3 is an end view of the bottom of the cylinder head of the present invention.

Referring to FIG. 3, the cylinder head 14 is shown from the bottom. The fixed orifice bore 77 is offset from the reduced diameter portion 70 of relief valve bore 62. The fixed orifice bore 77 extends angularly across the cylinder head 14 and intersects oil transfer bore 72 to allow fluid flow from annular cavity 202 to annular cavity 204.

Referring again to FIG. 1, during operation of the shock absorber 10 when the piston 16 having piston head 18 thereon is forced downwardly in the cylinder 12 toward the foot valve body 22, the foot valve plate 132 is forced by the oil within cavity 200 to cover the plurality of holes 124 in the foot valve body 22 thereby preventing the oil within the cavity 200 from flowing therethrough. When the oil within cavity 200 is prevented from flowing through the foot valve body 22, the oil flows into annular cavity 202 formed between cylinder 12 and piston 16 through the fixed orifice holes 98 in the piston head 18 thereby lifting ring valve plate 102 from the piston head 18. If a spring 103 is utilized to retain the ring valve plate 102 in position preventing oil flow through the plurality of holes 98 in the piston head 18, the spring 103 need only apply enough force to the ring valve plate 102 to retain the plate 102 in position when the shock absorber 10 is in a non-vertical position.

Since annular cavity 202 has a smaller volume than that of cavity 200, when the piston 16 having piston head 18 thereon is forced downwardly in the cylinder 12 toward the foot valve body 22 excess oil within annular cavity 202 flows through fixed orifice bore 77 until the pressure within annular cavity 202 increases sufficiently to cause relief ball 164 to be unseated from bore 178 of the valve spool 162 thereby allowing oil to also flow through oil transfer bore 72 into oil return tube 76 and into annular cavity 204 between cylinder 12 and outer case 20.

When the piston 16 is moved upwardly within cylinder 12 towards cylinder head 14, the ring valve plate 102 is forced by the oil within annular cavity 202 to cover the plurality of holes 98 in the piston head 18 thereby preventing the oil within the annular cavity 202 from flowing therethrough. At this point, the oil within annular cavity 202 flows through fixed orifice bore 77 until the pressure within annular cavity 202 increases sufficiently to cause relief ball 164 to be unseated from bore 178 of the valve spool 162 thereby allowing oil to also flow through oil transfer bore 72 into oil return tube 76 and into annular cavity 204 between cylinder 12 and outer case 20. While the piston 16 is moving towards cylinder head 14, due to the pressure differential between cavity 200 and annular cavity 204, the oil in annular cavity 204 is caused to flow through holes 124 in foot valve body 22 lifting the foot valve plate 132 from the foot valve body 22. If a spring 136 is utilized to retain the foot valve plate 132 in position blocking flow through holes 124 in the foot valve body 22, the spring 136 generally only need apply enough force to the foot valve plate 132 to retain the plate 132 in position blocking holes 124 in the foot valve body when the shock absorber 10 is in a nonvertical position.

During operation of the shock absorber 10 the performance of the shock absorber 10 is not substantially degraded due to the aeration of the oil. By utilizing an oil return tube 76 to return the oil from cavity 202 through relief check valve 160 to cavity 204 formed between cylinder 12 and outer case 20 with the outlet 80 of the oil return tube 76 being located substantially below the free surface level of the oil in the cavity 204 aeration of the oil in the shock absorber 10 due to air being entrained in the oil as the oil exits fixed orifice bore 77 and/or relief check valve 160 through oil transfer bore 72 is substantially eliminated thereby optimizing the performance of the shock absorber. Also, the spiral oil return tube 76 acts as a series of baffle members in the cavity 204 to prevent aeration of the oil due to movement of the oil within the cavity 204 during operation of the shock absorber 10. In this manner, the oil return tube 76 performs a dual function of the return of the oil from cavity 202 to 204 without aeration or the control of oil flow within cavity 204 without aeration thereby eliminating the separate usage of oil return tubes and baffles.

By utilizing the surface 134 of the cylinder 12 to retain the foot valve plate 132 in position in the foot valve body 22 the manufacture of the shock absorber has been simplified since an additional member secured to either the cylinder 12 or foot valve body 22 to retain the foot valve 132 is not required.

The piston bellows 26 is utilized to keep the piston 16 free of dust, dirt and abrasive material when in service thereby extending the life of the shock absorber 10.

By sizing cavity 202 to contain any ratio of the volume of cavity 200 the compression to extension hydraulic dampening ratio can be adjusted as required and the shock absorber 10 has a sufficient volume of oil present in the cylinder 12 at all times to ensure the desired performance of the shock absorber 10 without overheating or other degradation of the oil.

Having thus described my invention, I claim:

1. A shock absorber having fluid therein comprising:
cylinder means;
foot valve body means sealingly engaging one end of the cylinder means, the foot valve body means having apertures therethrough and foot valve plate means controlling the flow of said fluid through said foot body means;
outer case means having cover plate means on one end thereof, the cylinder means and foot valve body means disposed therein;
cylinder head means removably, sealingly engaging the other end of the cylinder means and outer case means, the cylinder head means having a central bore therethrough, annular seal means disposed within the central bore, relief check valve means disposed within a bore in the cylinder head means having an inlet and outlet thereto, and fixed orifice bore means having the inlet thereof communicating with the interior of the cylinder means and the outlet thereof communicating with the outlet of the relief check valve means, the relief valve means including:
annular valve spool means having first and second bores in the interior thereof;
relief valve ball means disposed within the annular valve spool means having a diameter larger than the diameter of the second bore of the annular valve spool means but smaller than the diameter of the first bore of the annular valve spool means;
spring support means disposed within the annular valve spool means, the spring support means comprising a cylindrical shaft having an enlarged head thereon adapted to engage the relief valve ball means;
valve spring means contained within the valve spool means having one end thereof abutting the enlarged head on the spring support means;
valve cap means having one end thereof adapted to abut the other end of the valve spring means; annular seal means located between the annular valve spool means and valve cap means; and
set screw means adapted to engage a portion of the bore within the cylinder head means and having one end thereof adapted to abut the valve cap means while the other end thereof contains a recess therein;
piston means having dust cover plate means secured to one end thereof and a reduced diameter portion on the other end thereof, the piston means slidingly, sealingly engaging the central bore of the cylinder head means;
piston head means secured to the other end of the piston means slidingly, sealingly engaging the cylinder means, the piston head means having a plurality of apertures therein and a piston head plate means slidably disposed on the reduced diameter portion of the piston means overlaying the plurality of apertures in the piston head means to control the flow of said fluid therethrough;
dust cover means having one end secured to the dust cover plate means of the piston means;
piston bellows means having one end secured to the cylinder head means and the other end secured to the end of the piston means having the dust cover plate means secured thereto; and
a plurality of attachment means secured to said shock absorber, one attachment means secured to the cover plate means of the outer case means and one attachment means secured to the dust cover plate means secured to the piston means.

2. The shock absorber of claim 1 further comprising:
oil return tube means having one end connected to the outlet of the relief check valve means of the cylinder head means and the other end located in a cavity formed between the cylinder means and outer case means.

3. The shock absorber of claim 2 wherein the oil return tube means comprises a spirally wound oil tube means located between the cylinder means and the outer case means.

4. The shock absorber of claim 3 wherein the oil return tube means extends from the cylinder head means to adjacent the foot valve body means.

5. The shock absorber of claim 1 wherein the foot valve means comprises:
foot valve plate means slidably retained in a recess formed between the cylinder means and foot valve body means.

6. The shock absorber of claim 1 wherein the foot valve body means further comprises foot valve body spring means biasing the foot valve plate means into engagement overlaying the apertures in the foot valve body means.

7. The shock absorber of claim 1 wherein the piston head means further comprises piston head spring means biasing the piston head plate means into engagement overlaying the apertures in the piston head means.

8. A shock absorber having fluid therein comprising:
cylinder means;
foot valve body means sealingly engaging one end of the cylinder means, the end of the cylinder means forming a recess between the cylinder means and foot valve body means, the foot valve body means having apertures therethrough, foot valve plate means disposed in the recess between the cylinder means and foot valve body means overlaying the apertures in the foot valve body means thereby controlling the flow of said fluid through said foot valve body means, and foot valve body spring means disposed in the recess between the cylinder means and foot valve body means biasing the foot valve plate means into engagement overlaying the apertures in the foot valve body means;
outer case means having cover plate means on one end thereof, the cylinder means and foot valve body means disposed therein;

cylinder head means removably, sealingly engaging the other end of the cylinder means and outer case means, the cylinder head means having a central bore therethrough, annular seal means disposed within the central bore, relief check valve means disposed within a bore in the cylinder head means having an inlet communicating with the cylinder means and an outlet thereof communicating with the outer case means, and fixed orifice bore means having the inlet thereof communicating with the interior of the cylinder means and the outlet thereof communicating with the outlet of the relief check valve means, the relief check valve means including:

annular valve spool means having first and second bores in the interior thereof;

relief valve ball means disposed within the annular valve spool means having a diameter larger than the diameter of the second bore of the annular valve spool means but smaller than the diameter of the first bore of the annular valve spool means;

spring support means disposed within the annular valve spool means, the spring support means comprising a cylindrical shaft having an enlarged head thereon adapted to engage the relief valve ball means;

valve spring means contained within the valve spool means having one end thereof abutting the enlarged head on the spring support means;

valve cap means having one end thereof adapted to abut the other end of the valve spring means; annular seal means located between the annular valve spool means and valve cap means; and set screw means adapted to engage a portion of the bore within the cylinder head means and having one end thereof adapted to abut the valve cap means while the other end thereof contains a recess therein;

piston means having dust cover plate means secured to one end thereof and a reduced diameter portion on the other end thereof, the piston means slidingly sealingly engaging the central bore of the cylinder head means;

piston head means secured to the other end of the piston means slidingly, sealingly engaging the cylinder means, the piston head means having a plurality of apertures therein, a piston head plate means slidably disposed on the reduced diameter portion of the piston means overlaying the plurality of apertures in the piston head means to control the flow of said fluid therethrough, and piston head spring means biasing the piston head plate means into engagement overlaying the apertures in the piston head means;

spirally wound oil tube means having one end connected to the outlet of the relief check valve means of the cylinder head means and the other end located in a cavity formed between the cylinder means and outer case means adjacent the foot valve body means;

dust cover means having one end secured to the dust cover plate means of the piston means;

piston bellows means having one end secured to the cylinder head means and the other end secured to the end of the piston means having the dust cover plate means secured thereto; and a plurality of attachment means secured to said shock absorber, one attachment means secured to the cover plate means of the outer case means and one attachment means secured to the dust cover plate means secured to the piston means.

* * * * *